United States Patent
Park

(10) Patent No.: US 12,459,395 B2
(45) Date of Patent: Nov. 4, 2025

(54) SYSTEM AND METHOD FOR ESTIMATING VEHICLE BATTERY CHARGING TIME USING BIG DATA

(71) Applicants: Hyundai Motor Company, Seoul (KR); Kia Corporation, Seoul (KR)

(72) Inventor: Hyun Soo Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1106 days.

(21) Appl. No.: 17/412,338

(22) Filed: Aug. 26, 2021

(65) Prior Publication Data

US 2022/0185142 A1  Jun. 16, 2022

(30) Foreign Application Priority Data

Dec. 15, 2020  (KR) .................. 10-2020-0175420

(51) Int. Cl.
  *B60L 53/68* (2019.01)
  *G01R 31/385* (2019.01)
(52) U.S. Cl.
  CPC ............ *B60L 53/68* (2019.02); *G01R 31/385* (2019.01)
(58) Field of Classification Search
  CPC ............................ B60L 53/68; G01R 31/385
  See application file for complete search history.

(56) References Cited

U.S. PATENT DOCUMENTS

| | | | |
|---|---|---|---|
| 2015/0286965 A1* | 10/2015 | Amano | B60L 53/68 705/5 |
| 2019/0118655 A1* | 4/2019 | Grimes | B60L 58/10 |
| 2019/0178678 A1 | 6/2019 | Rahbari Asr et al. | |

FOREIGN PATENT DOCUMENTS

| | | |
|---|---|---|
| JP | 2004-325235 A | 11/2004 |
| JP | 2008-010420 A | 1/2008 |
| JP | 6235036 B2 | 11/2017 |
| KR | 10-2014-0047758 A | 4/2014 |
| KR | 10-1449291 B1 | 10/2014 |
| KR | 10-1480616 B1 | 1/2015 |
| KR | 10-1567256 B1 | 11/2015 |
| KR | 10-2018-0069954 A | 6/2018 |
| KR | 10-1897297 B1 | 9/2018 |
| KR | 10-2019-0083897 A | 7/2019 |
| KR | 10-2020-0003318 A | 1/2020 |
| KR | 10-2020-0063307 A | 6/2020 |

* cited by examiner

*Primary Examiner* — David V Henze-Gongola
(74) *Attorney, Agent, or Firm* — Fox Rothschild LLP

(57) ABSTRACT

A system for estimating a charging time of a battery includes: a big data server that receives charger information that is identification information of a connected external charger, information on an area where the external charger is located, or information on a type of charging power supplied from the external charger, along with a first estimated charging time and an actual charging time of the battery, calculates an error between the first estimated charging time and the actual charging time, and calculates an estimated charging time correction value according to the charger information and the error; and a charging controller that calculates a second estimated charging time based on a state of the battery, and receives the estimated charging time correction value from the big data server and applies the received estimated charging time correction value to the second estimated charging time to calculate the first estimated charging time.

11 Claims, 6 Drawing Sheets

SYSTEM AND METHOD FOR ESTIMATING VEHICLE BATTERY CHARGING TIME USING BIG DATA

CROSS REFERENCE TO RELATED APPLICATION

The present application claims under 35 U.S.C. § 119(a) the benefit of Korean Patent Application No. 10-2020-0175420, filed Dec. 15, 2020, the entire contents of which is incorporated by reference herein.

BACKGROUND

1. Technical Field

The present disclosure relates to a system and method for estimating a vehicle battery charging time using big data, more particularly, to the system and method for estimating the vehicle battery charging time capable of more accurately deriving an estimated charging time, which may vary depending on a charging area, a charging method, and the like, using big data built through a big data server.

2. Description of the Related Art

In general, an eco-friendly vehicle is a vehicle that generates power by driving a motor using electric energy stored in a battery. The eco-friendly vehicle includes a battery capable of storing sufficient electric energy to generate power for the vehicle, and similar to injecting fuel in a typical internal combustion engine vehicle, the battery needs to be charged.

In the internal combustion engine vehicle, the injection of fuel is possible within a few minutes, but it takes a relatively long time to charge the battery. Therefore, it is very important to accurately estimate the time it takes to charge the battery in estimating and determining a drivable time of a vehicle.

Conventionally, a technique for estimating a charging time of a vehicle battery is implemented in a manner that an in-vehicle controller (for example, a battery management system (BMS)) estimates a charging time of the battery through a simple calculation using parameters of the battery itself such as a temperature and a state of charge (SOC) of the battery, initial charging power provided from an external charger, and the like.

However, in charging the battery, a large error may occur between the actual charging time and the estimated charging time due to various external factors such as a deviation in supplying charging power of the external charger or a power supply and demand status at an area where a charging station is located and a charging method (direct current or alternating current charging).

The contents described as the related art have been provided only for assisting in the understanding for the background of the present disclosure and should not be considered as corresponding to the related art known to those skilled in the art.

SUMMARY

An object of the present disclosure is to provide a system and method for estimating a vehicle battery charging time using big data capable of improving accuracy of estimation of a charging time by correcting for an error of an estimated charging time due to characteristics of an external charger supplying charging power to a vehicle using big data, an area where the external charger is located, a type of charging power supplied from the external charger, and the like, such that the error is reflected in the estimated charging time in the vehicle while charging the vehicle.

According to an embodiment of the present disclosure, a system for estimating a charging time of a battery, e.g., by using big data, includes: a big data server configured to calculate an estimated charging time correction value based on an error between a first estimated charging time and an actual charging time of the battery; and a charging controller configured to calculate a second estimated charging time based on a state of the battery, and apply the received estimated charging time correction value to the second estimated charging time to calculate the first estimated charging time.

The big data server may calculate the estimated charging time correction value based on the error and charger information of an external charger connected to the battery.

The charger information may include at least one of identification information of the external charger, information on an area where the external charger is located, or information on a type of charging power supplied from the external charger.

When the external charger is connected, the charging controller may transmit, as the identification information of the external charger, at least one selected from the group including an identification number of the external charger, manufacturer information of the external charger, or a product name or product code of the external charger to the big data server.

When the external charger is connected, the charging controller may transmit, as the information on the type of charging power, whether charging power supplied from the external charger is a direct current or an alternating current to the big data server.

The charging controller may display the calculated first estimated charging time on an instrument panel or audio video navigation (AVN) of a vehicle.

According to another embodiment of the present disclosure, a method for estimating a charging time of a battery, e.g., by using big data, includes: transmitting, by a charging controller of a vehicle, a charging condition to a big data server when an external charger is connected to the battery; determining, by the big data server receiving the charging condition, a correction value corresponding to the charging condition using pre-stored data; estimating, by the charging controller, a second estimated charging time based on a state of the battery; and deriving, by the charging controller, a first estimated charging time by applying the correction value to the second estimated charging time.

The charging condition may include identification information of the external charger, a location of the external charger (vehicle location), and a type of charging power of the external charger to the big data server.

When the external charger is connected to the vehicle, the charging condition may include, as the identification information of the external charger, at least one selected from the group including an identification number of the external charger, manufacturer information of the external charger, or a product name or product code of the external charger to the big data server.

When the external charger is connected to the vehicle, the charging controller may transmit, as the information on the type of charging power, whether charging power supplied from the external charger is a direct current or an alternating current to the big data server.

The method may further comprise after the deriving, displaying, by the charging controller, the calculated first estimated charging time on an instrument panel or audio video navigation (AVN) of the vehicle.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a system and method for estimating a vehicle battery charging time using big data according to various embodiments of the present disclosure will be described in detail with reference to the accompanying drawings.

Figure 1:
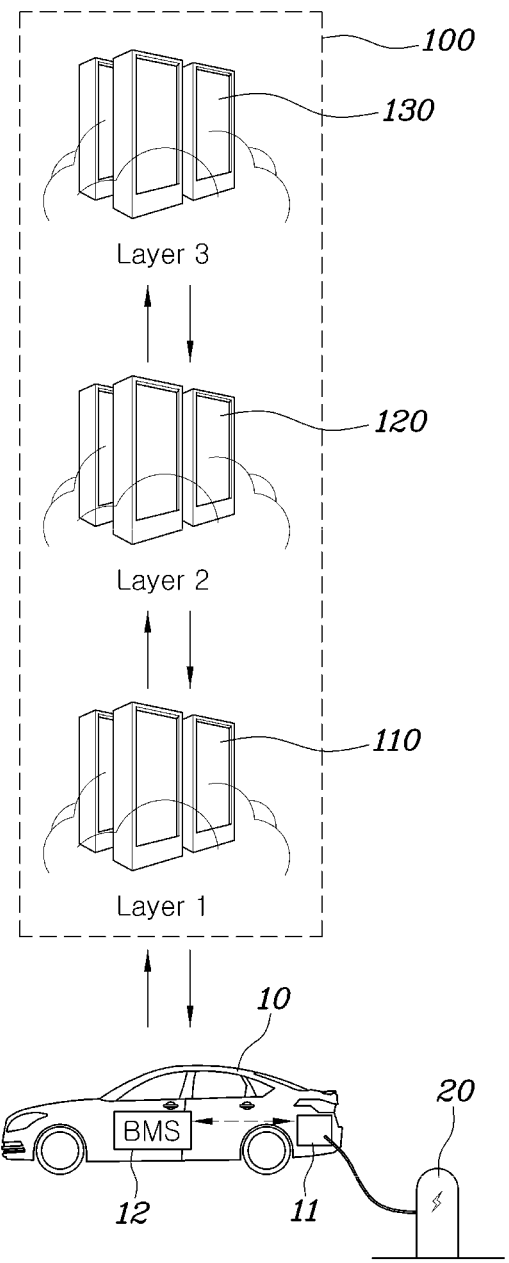
FIG. 1 is a configuration diagram illustrating a system for estimating a vehicle battery charging time using big data according to an embodiment of the present disclosure.

FIG. 1 is a configuration diagram illustrating a system for estimating a vehicle battery charging time using big data according to an embodiment of the present disclosure.

Referring to FIG. 1, the system for estimating a vehicle battery charging time using big data according to an embodiment of the present disclosure may be configured to include a big data server 100 that receives at least one of: identification information of an external charger 20, information on an area where the external charger 20 is located, or information on a type of charging power provided from the external charger 20 from a vehicle 10 connected to the external charger 20, along with an error between a first estimated charging time and an actual charging time of a battery 11 in the vehicle 10, and calculates an estimated charging time correction value according to the information, and a charging controller 12 in the vehicle 10 that calculates a second estimated charging time based on a state of the battery 11 and applies the estimated charging time correction value provided from the big data server 100 to the second estimated charging time to calculate the first estimated charging time.

The big data server 100 may receive various parameters related to a processor for charging the in-vehicle battery 11 from the vehicle 10, and may generate and store data obtained by processing and analyzing the received parameters.

In particular, in one embodiment of the present disclosure, the big data server 100 may generate and store additional parameters related to an estimation of the battery charging time based on parameters received from the vehicle 10 when the battery 11 is charged and secondary data generated using the parameters received from the vehicle 10, and generate the estimated charging time correction value by using the parameters received from the vehicle 10, the parameters generated from the vehicle 10 itself, and the like.

As illustrated in FIG. 1, the big data server 100 may be implemented in a hierarchical distributed clouding scheme having cloud servers 110, 120, and 130 for each layer.

For example, a first layer clouding server 110, which belongs to a lowermost layer of a plurality of layers, communicates with the vehicle 10 to log data generated from the vehicle 10 in real time, or provide the logged data to the vehicle 10 or provide the logged data to the clouding servers 120 and 130 belonging to an upper layer of the lowermost layer 110, if necessary.

The first layer clouding server 110 may log raw data generated in the vehicle in real time through communication with the vehicle. The first layer clouding server 100 may log and store vehicle data without data loss at a sampling rate as short as possible. In addition, the first layer clouding server 110 may limit the number of data that may be logged and stored per communicating vehicle. Of course, when resources are permitted, it is also possible to store all the data logged from the vehicle, but the first layer clouding server 100 mainly controls the vehicle by communicating with the vehicle in real time, and therefore, it is preferable to limit the number of data that may be stored per vehicle for the efficient use of the resources.

The raw data logged by the first layer clouding server 110 is data generated and transmitted from various controllers of the vehicle. In particular, in an embodiment of the present disclosure for estimating the charging time of the battery, the first layer clouding server 110 may directly receive various charging-related parameters from the vehicle 10 and classify parameters to be used to calculate another factor related to the battery charging.

The real-time data provided from the vehicle 10 to the first layer clouding server 110 may be data of factors affecting the charging and charging time of the battery 11 installed in the vehicle. For example, the real-time data may include a vehicle type, a state of health (SoH) of a battery, a state of charge (SoC) of a battery when the charging starts, a state of charge of a battery when the charging ends, an ambient temperature (outdoor temperature) of a battery, maximum power of the external charger 20 providing the charging power, a type (direct power or alternating power) of charging power provided by the external charger 20, an installation area of the external charger 20, an identification number of the external charger 20, a manufacturer of the external charger 20, product information of the external charger 20, a charging time zone, a charging demand amount, an estimated charging time, a season, a charging time taken to charge the actual battery, and the like.

The big data server 100 may collect the battery charging and charging time-related factors as described above from a plurality of vehicles, and generate a correction value for solving a deviation in the estimated charging time based on the collected parameters.

The comparison of the estimated charging time with the actual charging time, the calculation of the estimated charging time correction value, and the like may be performed in an upper cloud server, such as the second and third cloud servers 120 and 130.

The second layer clouding server 120 or the third layer clouding server 130 may calculate the deviation in the charging time based on the factors related to the charging and charging time collected by the first layer clouding server 110. In other words, it is possible to calculate the error in the charging time according to the combination of the power type (DC or AC) of the charger, the manufacturer of the charger, the installation area of the charger, the charging time zone, the season, the battery SOC at the beginning of the charging, the battery SOC at the end of the charging, the temperature of the battery at the time to the beginning of the charging, and the ambient temperature of the battery.

When the error of the charging time according to the combination of the charging time-related factors is collected in a predetermined sufficient number, the second clouding server 120 or the third clouding server 130 may determine the error of the charging time for the corresponding combination as the charging time correction value. This correction value is transmitted to the vehicle initiating the charging, and the vehicle may display the corrected estimated charging time by applying the received correction value to the calculated estimated charging time.

As described above, in one embodiment of the present disclosure, the big data server 100 may generate a correction value for correcting the error between the expected charging time and the actual charging time, and may transmit an appropriate correction value to the vehicle 10 whose battery is to be charged to correct the calculated estimated charging time calculated based on the state of the battery 11 of the vehicle using the correction value before the vehicle 10 starts to charge, so the estimated charging time may be more accurately displayed to the driver.

FIG. 1 is for illustratively describing an embodiment implemented with a total of three layers, and the number of layers may be appropriately adjusted as necessary.

The vehicle 10 may include the charging controller 12 that monitors the battery 11 and the state of the battery 11 and calculates the estimated charging time based on the information on the battery 11 and the connected external charger when the battery 11 is charged. The charging controller 12 may be a battery management system (BMS) provided to manage a battery of a general motor-driven vehicle. It can be understood that the various controls described herein as being performed by the vehicle 10 are performed by a controller provided in the vehicle, particularly, the charging controller 12 related to the charging of the battery 11.

In addition, the vehicle 10 may finally determine the estimated charging time by applying the correction value received from the big data server 100 to the estimated charging time calculated based on the information on the battery 11 and the connected external charger. Hereinafter, for convenience of explanation, the estimated charging time finally determined by applying the correction value of the big data server 100 is referred to as the first estimated charging time, and the estimated charging time calculated based on the information on the battery 11 and the connected external charger before the correction value is applied may be referred to as the second estimated charging time.

Figure 2:
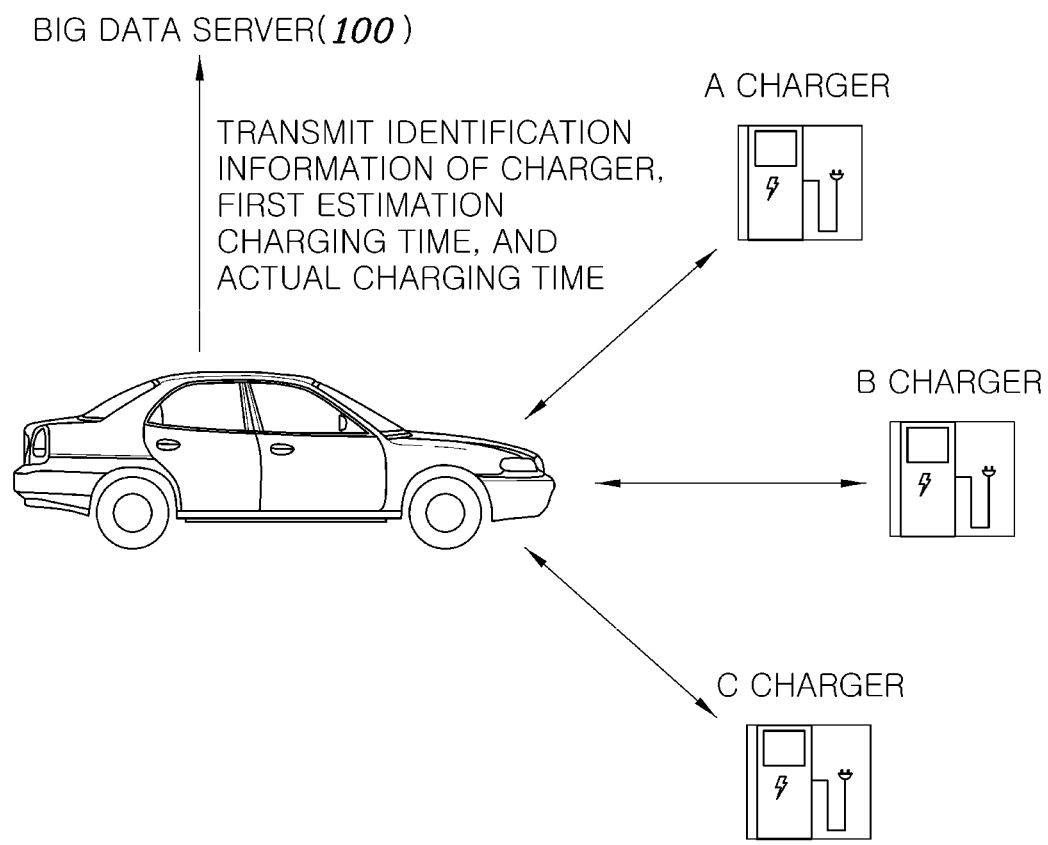
FIGS. 2 to 4 are diagrams illustrating certain information transmitted from a vehicle to a big data server in a system and method for estimating a vehicle battery charging time using big data according to an embodiment of the present disclosure.
Figure 3:
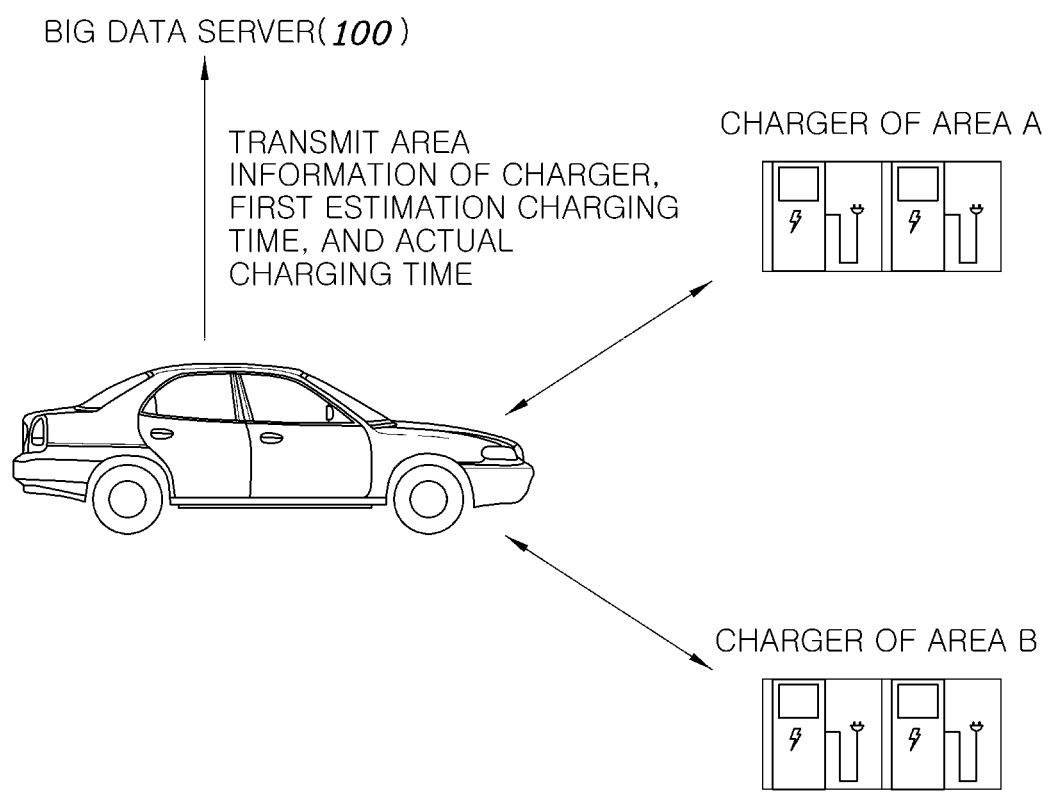
Figure 4:
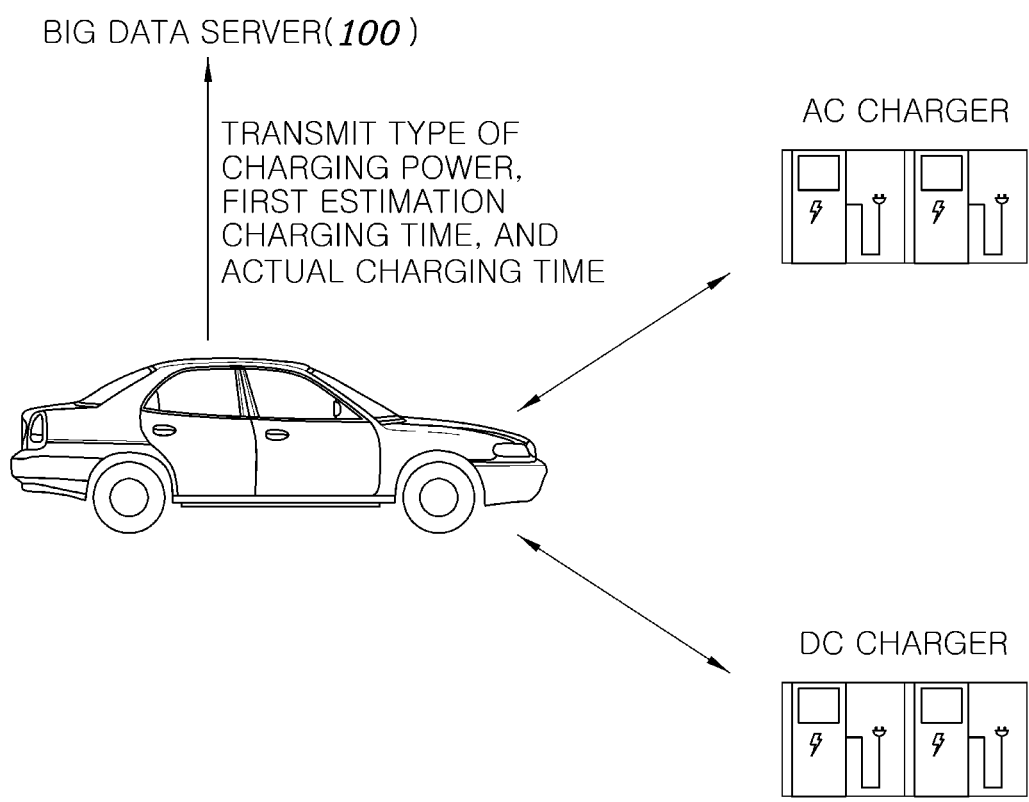

FIGS. 2 to 4 are diagrams illustrating certain information transmitted from a vehicle to a big data server in a system and method for estimating a vehicle battery charging time using big data according to an embodiment of the present disclosure.

As illustrated in FIG. 2, the vehicle 10 may charge the battery 11 by using a plurality of different chargers whenever charged, and when charging, the vehicle 10 may receive the information capable of identifying the external charger connected to receive the charging power from the charger and transmit the received information to the big data server 100. Here, the information that may identify the external charger is an identification number that may distinguish the individual charger 20 from other chargers. Generally, chargers manufactured by one manufacturer may have similar electrical characteristics or a charger of one product group may have similar characteristics similar to each other and therefore may be a product name, a product code, or the like of an external charger.

The vehicle 10 may transmit the actual charging time and the finally calculated first estimated charging time to the big data server 100 together with information for identifying the external charger.

In addition, as illustrated in FIG. 3, the vehicle 10 may transmit area information where an external charger is installed to the big data server 100 whenever charged. The area information in which the external charger 20 is installed may be derived by using the location information of the vehicle acquired through GPS from the audio video navigation (AVN) device provided in the vehicle. This is because there is a difference in power supply and demand for each area, even if the charger is the same, the difference in performance may occur when the state of the power supply and demand is used in different areas. In consideration of the effect of the difference in power supply and demand for each region on calculating the estimated charging time of the present disclosure, the vehicle 10 may transmit the area information to the big data server 100 during charging.

The vehicle 10 may transmit the actual charging time and the finally calculated first estimated charging time to the big data server 100 together with the area information.

In addition, as illustrated in FIG. 4, the vehicle 10 may transmit information on whether the type of the charging power supplied by the external charger is DC power or AC power to the big data server 100 whenever charged. This is because the charging power supplied from the external charger 20 may have different characteristics for each type.

The vehicle 10 may transmit the actual charging time and the finally calculated first estimated charging time to the big data server 100 together with the type of the charging power.

Figure 5:
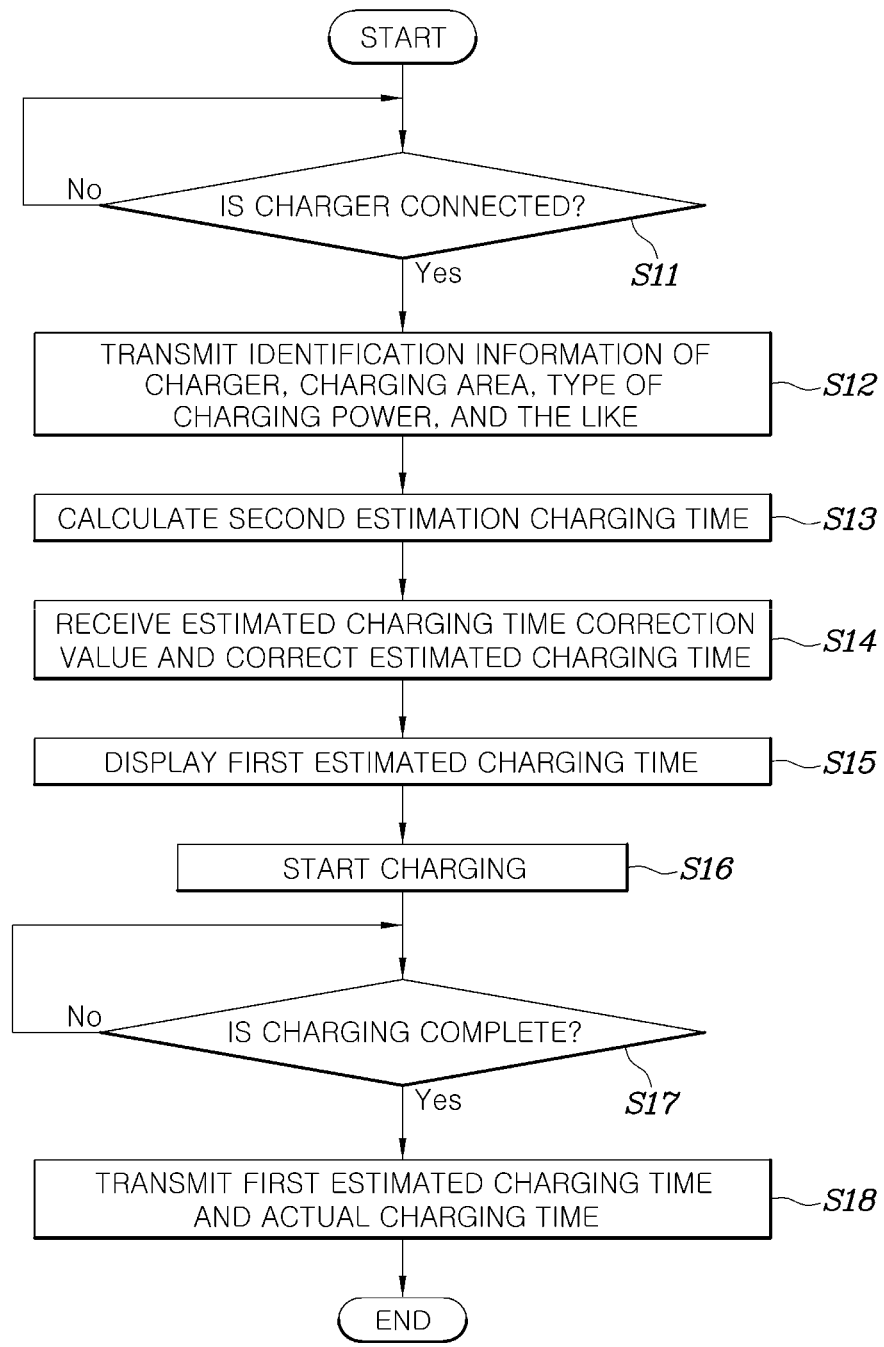
FIG. 5 is a flowchart illustrating an operation of a vehicle in a method for estimating a vehicle battery charging time using big data according to an embodiment of the present disclosure.
Figure 6:
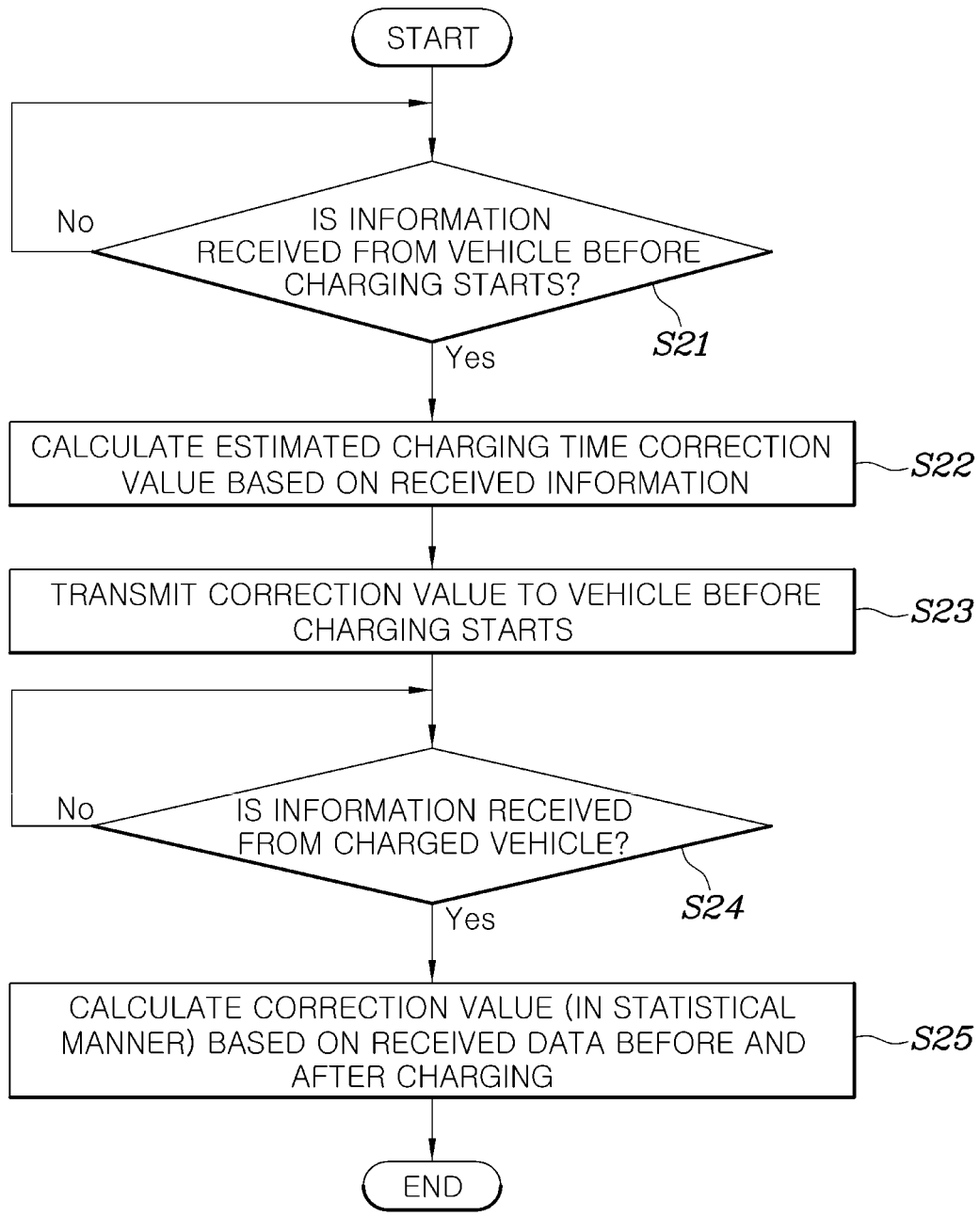
FIG. 6 is a flowchart illustrating an operation of a big data server in the method for estimating a vehicle battery charging time using big data according to the embodiment of the present disclosure.

FIG. 5 is a flowchart illustrating an operation of a vehicle in a method for estimating a vehicle battery charging time using big data according to an embodiment of the present disclosure, and FIG. 6 is a flowchart illustrating an operation of a big data server in the method for estimating a vehicle battery charging time using big data according to the embodiment of the present disclosure.

Through the description of the method for estimating a vehicle battery charging time using big data according to an embodiment of the present disclosure, the operation and effect of the system for estimating a vehicle battery charging time using big data having the configuration as described above will be more clearly understood.

Referring to FIGS. 5 and 6, in the system for estimating a vehicle battery charging time using big data according to the embodiment of the present disclosure, first, the big data server 100 may collect various data from the plurality of vehicles 10 and generate the conditions (charger, charger area, type of charging power) that are the basis of the estimation of the charging time and a correction value for correcting the error of the estimated charging time and the actual charging time and the correction value for the error according to the conditions.

The big data server 100 may receive conditions used to derive the correction value before the vehicle charging starts, provide the correction values corresponding to these conditions to the vehicle, and receive, from the vehicle 10, the estimated charging time to which the actual charging time and the correction value are applied after the charging of the vehicle ends.

When the charging controller 12 of the vehicle 10 is connected to the external charger 20 for charging the battery 11 (S11), the charging controller 12 transmits the identification information of the charger, the location of the charger (the location of the vehicle), the type of charging power of the charger to the big data server 100 (S12).

Next, the charging controller 12 of the vehicle 10 may calculate a second estimated charging time by applying a preset algorithm or the like based on the charging-related parameter at the starting point of charging (S13). The in-vehicle charging controller 12 may calculate the second estimated charging time by applying the charging-related parameters (for example, the temperature of the battery, the battery SOC, the charging power provided from an external charger, and the like) of the battery 11 to the set algorithm at the start of charging the battery. As the algorithm for calculating the estimated charging time of the battery, various algorithms known in the art may be applied.

Then, the charging controller 12 of the vehicle 10 may receive the correction value calculated in advance by the big data server 100 from the big data server 100, and applies the correction value to the second estimated charging time to calculate the first estimated charging time which is the final estimated charging time (S14). The big data server 100 may determine and transmit the correction value based on the charger identification information received from the charging controller 12 of the vehicle 10 in step S12, the charger location (vehicle location), and the charging power type information of the charger, and the charging controller 12 of the vehicle 10 may receive the correction value in step (S14) and apply the received correction value to calculate the first estimated charging time.

Subsequently, the charging controller 12 of the vehicle 10 may display the calculated first estimated charging time on the instrument panel or AVN of the vehicle.

Then, the charging controller 12 of the vehicle 10 may start the charging by supplying the charging power of the external charger 20 to the battery 11 (S16), and when the charging ends (S17), may transmit the actual charging time and the first estimated charging time to the big data server 100.

Meanwhile, when the big data server 100 receives information from the vehicle in the state before starting the charging (S21), the big data server 100 may determine a correction value of the estimated charging time based on the received information (S22). This may be performed based on the correction value according to the previously derived charging conditions (the charger, the charger location, the type of charging power of the charger) using the previously received and calculated information (the identification information of the charger, the charger location (vehicle location), the charging power type information of the charger, the actual charging time of the battery, the first estimated charging time, the error of the actual charging time and the first estimated charging time, or the like). That is, the big data server 100 may determine and store the correction value according to the charging condition in a statistical manner in advance, and when the charging condition is transmitted from the vehicle 10 in the charging standby state, may determine the correction value corresponding to the received charging condition among the stored correction values.

Then, the vehicle may transmit the determined correction value to the vehicle 10, and thus the charging controller 12 of the vehicle 10 may apply the correction value to the second estimated charging time to calculate the first estimated charging time.

Subsequently, when the charging of the vehicle 10 ends, and the big data server 100 receives the actual charging time and the first estimated charging time from the vehicle 10 (S24), the big data server 100 may calculate the error of the actual charging time and the first estimated charging time and calculate the correction value capable of reducing this error (S25).

In step S25, the big data server 100 may calculate an error for each charging condition corresponding to the identification information of the charger, the charger location (vehicle location), the charging power type information of the charger, and the like, and calculate the correction value capable of reducing this error. Since the correction value for each condition is previously stored in the big data server 100, in step S25, the big data server 100 may calculate the error when the charging conditions are input from the vehicle that has been charged and may calculate the correction value in a manner of correcting the previously stored correction value so as to reduce the error. For example, when the error gradually decreases, the big data server 100 may increase the size of the correction value by a preset unit. Accordingly, the error received thereafter may decrease according to the size of the increased correction value, and as the size of the correction value gradually increases, the size of the error may eventually converge to zero.

According to the system and method for estimating a vehicle battery charging time using big data, it is possible to more accurately estimate the charging time in consideration of the deviation in performance between the chargers, the deviation in power supply and demand between areas, the deviation by charging power, and the like by storing the correction value capable of previously correcting the error of the estimated charging time in the big data server according to the external chargers providing the charging power to the vehicle battery, the areas where the external chargers are installed, and the type of charging power supplied from the external chargers and providing the correction value when charging the vehicle.

Effects which can be achieved by the present disclosure are not limited to the above-mentioned effects. That is, other objects that are not mentioned may be obviously understood by those skilled in the art to which the present disclosure pertains from the following description.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A system for estimating a charging time of a battery of a vehicle, comprising:
    an external charger connected to the battery and configured to supply a charging power for charging the battery;
    a big data server configured to:
        receive a first estimated charging time and an actual charging time of the battery from a charging controller of the vehicle after charging of the battery by the external charger ends;
        calculate an error between the first estimated charging time and the actual charging time of the battery; and
        calculate an estimated charging time correction value based on the error between the first estimated charging time and the actual charging time of the battery; and
    the charging controller further configured to:
        charge the battery based on the charging power,
        calculate a second estimated charging time based on a state of the battery,
        receive the estimated charging time correction value from the big data server, and
        apply the received estimated charging time correction value to the second estimated charging time to calculate an updated first estimated charging time.

2. The system of claim 1, wherein the big data server calculates the estimated charging time correction value based on the error and charger information of the external charger connected to the battery.

3. The system of claim 2, wherein the charger information includes at least one of identification information of the external charger, information on an area where the external charger is located, or information on a type of charging power supplied from the external charger.

4. The system of claim 3, wherein when the external charger is connected to the battery for the charging, the charging controller transmits, as the identification information of the external charger, at least one selected from the group including an identification number of the external charger, manufacturer information of the external charger, or a product name or product code of the external charger to the big data server.

5. The system of claim 3, wherein when the external charger is connected to the battery for the charging, the charging controller transmits, as the information on the type of charging power, whether charging power supplied from the external charger is a direct current or an alternating current to the big data server.

6. The system of claim 1, wherein the charging controller displays the calculated first estimated charging time on an instrument panel or audio video navigation (AVN) of a vehicle.

7. A method for estimating charging time of a battery of a vehicle, the method comprising:
    supplying, by an external charger, a charging power for charging the battery;
    charging, by a charging control of the vehicle, the battery based on the charging power;
    transmitting, by the charging controller of the vehicle, a first estimated charging time, an actual charging time, and a corresponding charging condition of the external charger to a big data server after charging of the battery by the external charger ends;
    calculating, by the big data server, an error between the received first estimated charging time and the actual charging time of the battery;
    determining, by the big data server, a correction value corresponding to the charging condition using pre-stored data, wherein the correction value reduces the error;
    estimating, by the charging controller, a second estimated charging time based on a state of the battery;
    receiving, by the charging controller, the correction value from the big data server; and
    deriving, by the charging controller, an updated first estimated charging time by applying the received correction value to the second estimated charging time.

8. The method of claim 7, wherein the charging condition includes identification information of the external charger, a location of the external charger, or a type of charging power of the external charger to the big data server.

9. The method of claim 8, wherein when the external charger is connected to the battery for the charging, the charging condition includes, as the identification information of the external charger, at least one selected from the group including an identification number of the external charger, manufacturer information of the external charger, or a product name or product code of the external charger to the big data server.

10. The method of claim 8, wherein when the external charger is connected to the vehicle for the charging, the charging controller transmits, as the information on the type of charging power, whether charging power supplied from the external charger is a direct current or an alternating current to the big data server.

11. The method of claim 7, further comprising: after the deriving, displaying, by the charging controller, the calculated first estimated charging time on an instrument panel or audio video navigation (AVN) of the vehicle.

* * * * *